(12) United States Patent
O'Callaghan

(10) Patent No.: US 7,174,034 B2
(45) Date of Patent: Feb. 6, 2007

(54) REDEYE REDUCTION OF DIGITAL IMAGES

(75) Inventor: Andrais O'Callaghan, San Francisco, CA (US)

(73) Assignee: Seiko Epson Corporation, Tokyo (JP)

( * ) Notice: Subject to any disclaimer, the term of this patent is extended or adjusted under 35 U.S.C. 154(b) by 666 days.

(21) Appl. No.: 09/834,816

(22) Filed: Apr. 13, 2001

(65) Prior Publication Data
US 2002/0150292 A1    Oct. 17, 2002

(51) Int. Cl.
G06K 9/00      (2006.01)
G06K 9/34      (2006.01)
G06K 9/40      (2006.01)

(52) U.S. Cl. .................. 382/117; 382/164; 382/165; 382/167; 382/274

(58) Field of Classification Search ............. 382/117, 382/164–167, 257, 217–274
See application file for complete search history.

(56) References Cited

U.S. PATENT DOCUMENTS

| | | | |
|---|---|---|---|
| 5,432,863 A | 7/1995 | Benati et al. | |
| 5,596,346 A | 1/1997 | Leone et al. | |
| 5,748,764 A | 5/1998 | Benati et al. | |
| 5,990,973 A * | 11/1999 | Sakamoto | .............. 348/576 |
| 6,009,209 A | 12/1999 | Acker et al. | |
| 6,016,354 A | 1/2000 | Lin et al. | |
| 6,134,339 A | 10/2000 | Luo | |
| 6,151,403 A | 11/2000 | Luo | |
| 6,160,923 A | 12/2000 | Lawton et al. | |
| 6,631,208 B1 * | 10/2003 | Kinjo et al. | .............. 382/167 |

* cited by examiner

Primary Examiner—Bhavesh M. Mehta
Assistant Examiner—Wes Tucker
(74) Attorney, Agent, or Firm—Rasalio Haro

(57) ABSTRACT

A redeye reduction system creates a first matrix of candidate pixels by comparing a color-and-brightness parameter of image pixels to a first threshold. Cohesive groups of candidate pixels are collected into components, and the component having the pixel with the highest color-and-brightness parameter is identified as first redeye region. The average color-and-brightness parameter and the size of the remaining components are compared to a range dependent on the values of the first redeye region, and the components having values within the range are defined as candidate components. The candidate component with the densest pixel population is defined as a second redeye pupil region. The defined redeye pupils are dilated and compared with a second threshold lower than the first threshold to generate a new list of candidate pixels. The new candidate pixels are colored dark gray and their adjacent pixels are colored a lighter gray.

39 Claims, 6 Drawing Sheets

REDEYE REDUCTION OF DIGITAL IMAGES

BACKGROUND OF THE INVENTION

1. Field of the Invention

This invention relates generally to the reduction of redeye in digital images, and specifically to the identification and correction of redeye regions within a digital image.

2. Description of the Related Art

Redeye occurs when a flash positioned near the lens of a camera enters the pupils of a subject's eyes, and then bounces off the eye's blood-rich retinal membranes back to the camera. The resultant image may now have a redeye effect, namely the image of the pupil of the eye appears to be unnaturally red. The redness can be mitigated through optical means or through digital processing.

Although most cameras attempt to reduce it, the "redeye" effect appears in many photographs. At the instant the photo is taken, bright light from the flash enters the eye through the pupil and reflects off the retina (the back of the eye) to the camera. The unwanted reflection leaves the subject with unnaturally red, glowing eyes.

In most redeye photos, the effect conforms to the following description. The sclera (the white part) is not affected. The iris (colored part) of the eye is not affected. The cornea (the clear part in front of the pupil) is not affected. Although this portion of the eye is clear, a small reflection of the flash from the cornea leaves a natural looking 'glint' in the eye. This glint is superimposed over the pupil. The pupil (the hole in the eye that one sees through) is affected. Instead of appearing dark or black, the pupil is red and luminescent. Regardless of whether the pupil is red or black, the glint in the cornea is visible as a very light area within the pupil.

In digital photos, because the precision of focus and resolution of display are not infinite (and may indeed be very poor), the redeye-affected region may spill over to the regions immediately adjacent to the pupil. This region of blending usually extends one or two pixels out of the pupil, but can be greater, especially if the picture has been blown up to a size greater than its resolution allows for.

The reduction or elimination of redeye can be attempted while the photograph is being taken or after it has been taken. The common approach for redeye reduction adopted in cameras is usually the following: a pre-flash is made before the photo is actually taken, thereby conditioning the eye to lessen the opening size of the pupil diameter. Therefore when the flash of the actual photograph goes off, the reflection of the retina is not so noticeable. Positioning of the flash well above the camera lens can also mitigate the redeye effect. Regardless of whether precaution against redeye was taken by the photographer, redeye may still end up in the resulting picture. Indeed, there are many photos in circulation today that would benefit from the removal of redeye. Therefore, it is valuable to discuss the removal of redeye from a photo after it has been taken.

The technique to remove redeye from a photo involves two phases: redeye pupil location and color replacement. In the redeye pupil location phase, the pupil or pupils exhibiting the redeye effect are found. In the color replacement phase, the color of the pupil or pupils is changed so that they look more like ordinary pupils than redeye pupils.

Pupil location is the more interesting and difficult problem. It can be accomplished manually or automatically. Manual pupil location requires that the user identify the problem region. Automatic pupil location is very difficult to reliably ensure due to possible interference or confusion from other parts of the image. An example of automatic pupil location is shown in U.S. Pat. No. 6,151,403. A reasonable balance between fully manual and fully automatic pupil location is automatic detection within a manually selected area of interest. This allows the user to crop out any confusing areas of the photo so that the automatic redeye detector can more easily find the elusive pupil or pupils. Examples of redeye reduction are found in the following U.S. Pat. Nos.: 6,134,339; 6,160,923; 6,009,209; 5,596,346; and 5,432,863.

The success of different redeye reduction techniques varies more in the pupil location algorithm than in the color replacement. Poor color replacement may leave the image looking scarcely better than it had before the touch-up. Poor pupil location will surely make the image look worse. Location of the pupil is also more time consuming than color replacement. Speed is crucial to good pupil location.

U.S. Pat. No. 6,016,354 to Lin et al., incorporated herein by reference, presents the following scheme for redeye reduction. The user selects a small rectangular section of a digital image within which lies at least one redeye pupil. A threshold is applied to the pixels within that section so that pixels with a value above the threshold are considered as candidate redeye pixels and those below are ignored (the threshold is applied to a measure of redeye likelihood, not just the pixels' R value). A pupil search is conducted on the candidate pixels. This search yields the largest circular collection of pixels with the highest concentration of candidate pixels by least squares. Some extra work addresses the issue of the pupil found containing no more and no less than the entire instance of that redeye pupil. Each pixel in the pupil is replaced with a gray value with 70% of the original's luminescence. This attempts to preserve the pupil's glint while leaving it with a more natural color.

Adobe's Photo Deluxe© Business edition has a redeye reduction function that works quite effectively and has a good balance between speed of execution and effectiveness. While the underlying algorithm details are not known to the Applicant, the following observations were made: (a) it uses the same input as required by Lin et al., (b) the pupil location algorithm seems to be different than the method of Lin et al. in that it appears faster and it attempts to find a second pupil after it finds the first. Its color replacement produces similar results as Lin et al. The pupil is close to its proper color and the glint appears nearly as bright as it should be.

However, both have drawbacks. Redeye correction is difficult, and nobody does a spotless job. Therefore, the best redeye algorithm is that with the fewest faults. Applicant examined various faults that occur in redeye algorithms. These can be categorized as qualitative and quantitative faults in results, and speed issues. It seems difficult to imagine an algorithm requiring significantly less space for operation since the entire input rectangle must be in memory at once.

The algorithm of Lin et al. required $h*w*\log(\min(h,w))$ time for pupil location where h and w are the sides of the input rectangle. Photo Deluxe© uses about the same amount of time. It achieves an almost instantaneous result with a small input rectangle, but slows down significantly with larger ones and ultimately pops up a warning dialogue box if the input is huge. Because it is likely that the instance of redeye fits within a small rectangle, this behavior isn't of much concern. It would be nice, however, to find an algorithm that is linear in time with respect to n, defined as $h*w$. This algorithm would go over each pixel in the input a constant number of times before deciding where the pupils are.

For the term "quantitative faults" to have any meaning in terms of results, it must be defined. We will call failure to locate a redeye pupil a quantitative error in a redeye correction algorithm. Also, redeye software that mistakenly locates an area as redeye will be said to have a quantitative fault in its result. Because all techniques will be susceptible to some sort of error in this area, "improvement" may not be a hard and fast term. Lin et al. have two major faults here.

Adobe's Photo Deluxe© not only is able to reduce the redeye effect like the algorithm of Lin et al. but it also attempts to find a second eye. Unfortunately, in cases where only one redeye pupil is in the input rectangle (or when it fails to find an existing second pupil), an unwanted circle is declared a redeye pupil and corrected as such, leaving an unsightly circular blotch of gray on a pimple or a red earring, or other image having round red characteristics.

Qualitative faults in results encompass poor replacement color or strategy, unnecessary obscuring of the pupil's glint, or lack of versatility in high/low brightness/contrast situations. Both Lin et a. and Adobe Photo Deluxe©, seem to do a sub-optimal job of preserving the pupil's glint. Each algorithm comes up with a solid circular area (encompassing this glint) to darken and gray. The shine is preserved at all by the fact that the pupil is not darkened too much. Unfortunately, this can sometimes be noticed when the pupil is not quite dark enough to look real. A better color replacement algorithm is needed. Preferably one that would leave the glint alone and darken only the red pupil area.

OBJECTS OF THE INVENTION

Therefore, it is an object of the present invention to provide a color replacement algorithm that does not harm the light glint in the pupil.

It is another object of the present invention to provide a redeye correction system whose execution time is linear in time with respect to the number of pixels in a region to be corrected.

It is another object of the present invention to provide a quick, simplified, and effective redeye correction system.

It is still another object of the present invention to provide a redeye reduction system capable of quickly determining if a second pupil exists within an image region to be corrected.

SUMMARY OF THE INVENTION

The present invention uses the semiautomatic approach to reduce the redeye effect using digital image processing techniques. That is, an area of interest is cropped and submitted by a user, and the present invention then automatically locates a first and, possibly, a second pupil within the area.

A color-and-brightness-based parameter of the pixels in an area of interest is first compared with a first threshold value to produce a first matrix of candidate redeye pixels. The matrix is then refined by removing non-cluster regions of candidate pixels. The remaining pixels are then gathered into components of cohesive candidate pixels. As the components are determined, statistical data about each component is generated and stored. The statistical data may include the highest color-and-brightness-based parameter value of the component's pixels, the average color-and-brightness-based parameter value of the component's pixels, the size of the component, and optionally a boundary square population value of the component, which is a measure of the pixel density within the smallest square in which a component fits, the higher the boundary square population value the denser the pixel population.

A second matrix may also be generated by comparing the pixels in the area of interest with a second threshold value lower than the first threshold value.

The component having the pixel with the highest color-and-brightness-based parameter value is identified as a first redeye pupil region. The average color-and-brightness-based parameter value and size parameter value of the remaining components are then checked to see if they lie within respective predefined ranges based on the first redeye pupil's average color-and-brightness-based parameter value and size parameter value. If no component has both parameters within the predefine ranges, then no second pupil is identified. Components that do match the calculated ranges are categorized as candidate components and their respective boundary square population values are compared. The candidate component having the densest population of pixels is designated as a second redeye pupil region.

The identified redeye pupil regions are then dilated beyond their boundary and all pixels within the dilated boundary that meet the above described second threshold value are categorized as candidate redeye pixels. Thus, the boundaries of the redeye regions are redefined. The redefined redeye regions are colored with a dark gray that corresponds to the pixels' original values, and the pixels adjacent the redefined redeye regions are colored with a lighter gray.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The prior art discussed above has a few drawbacks. First, the prior art's selection of the largest, most dense collection of redeye candidate pixels as the redeye region is not always the best way to find the pupil. Applicant has found that other factors, such as average brightness or brightest element may help to distinguish between a bright redeye pupil and a dull red section of a sweater. Second, in finding and eliminating redeye one eye at a time, the prior art throws away valuable information that may be useful in locating additional unwanted redeye regions.

The redeye effect usually comes in pairs. One eye, however, is usually looking slightly more directly at the camera's flash than the other due to the fact that the eyes are a couple of inches apart, but pointing the same direction. What this means to the digital photo is that, especially in close-up pictures where the parallax is very great, one eye will be brighter than another. In fact, the less extreme of the two red eyes may be very slight, but still noticeable. In practice, the more severe eye will be very easy to locate. The less severe eye may be very difficult to locate on its own, but can be much easier with information about the first eye. Its size, location, shape, and intensity can all contribute in finding the hard-to-see redeye. Correcting the first eye alone will not only lose this information, but will also contribute to the background red-noise, actually making finding the second eye more difficult since its intensity is likely to be lower and thus more easily lost among other red regions of an image.

The present invention combines features of existing redeye correction techniques with additional innovations to produce a redeye reduction algorithm with better results. The input to the algorithm is a rectangular area of interest within a digital image selected by a user. The output is that section corrected for redeye. Furthermore, the running time of the present redeye correction technique is linear with respect to the input size in pixels.

Figure 1:
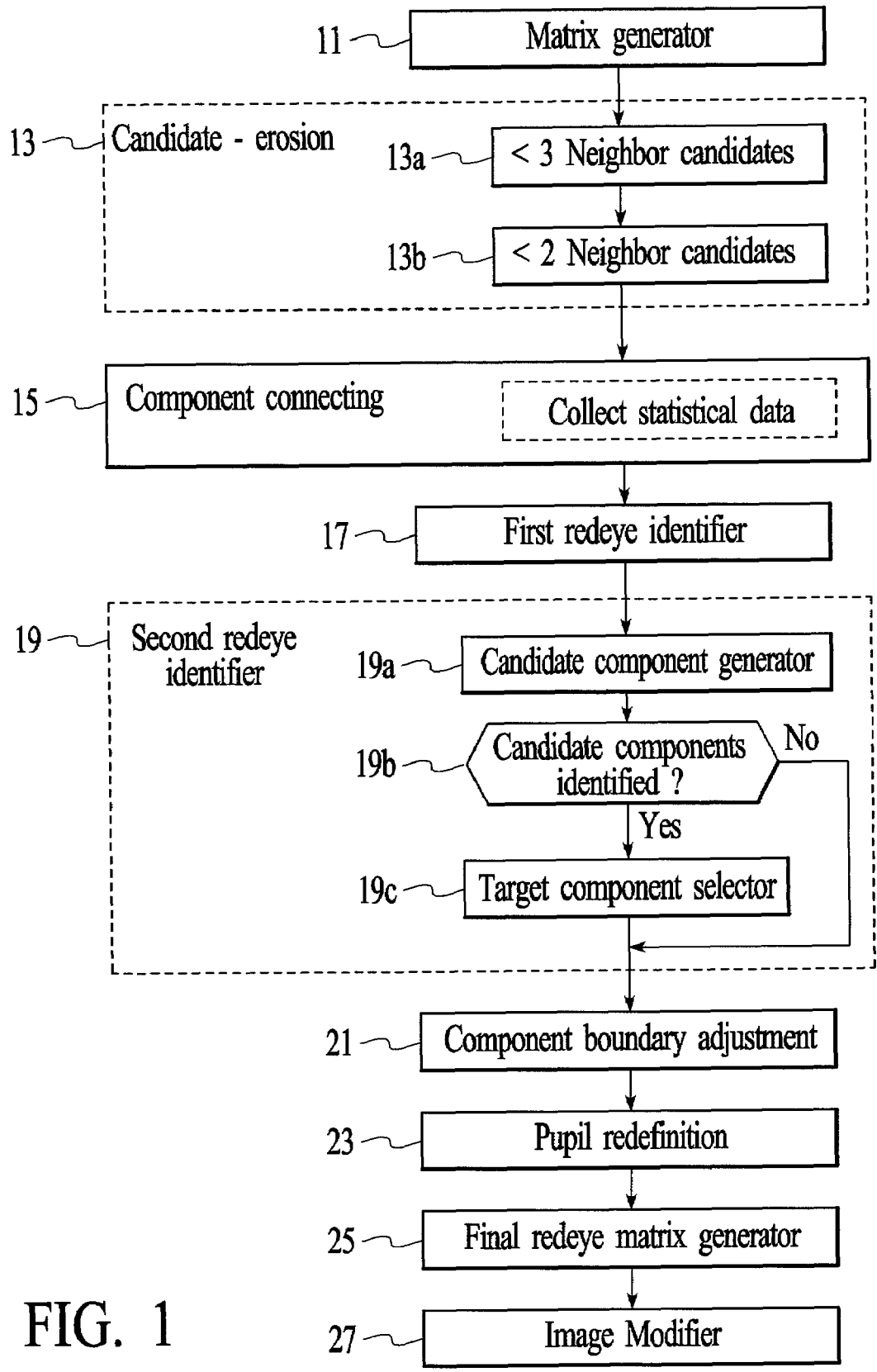
FIG. 1 is a diagrammatic illustration of the present invention.

With reference to FIG. 1, the first step 11 is to generate a matrix highlighting a specific characterization of the pixels within the rectangular area of interest. The matrix typically compares each pixel with a color-based parameter threshold, such as looking for a particular red color and brightness intensity, and identifies all the pixels that meet the threshold value. Many parameter matrix generating routines and criteria are known in the art, and of particular interest to the present invention is one based on the chrominance in the red color plane of an altered form of the RGB representation of the image.

In the presently preferred embodiment, matrix generator block 11 first raises each pixel's R, G, and B values (i.e. red, green, and blue values) to the ⅓ power. This seemingly bizarre transformation of the image has been experimentally determined to make redeye easier to distinguish. The altered RGB data is converted to YCrCb values where Y represents luminance information and Cr and Cb represent chrominance information. A first threshold T is assigned the value $$T = Cr_{avg} + 0.2 * (Cr_{max} - Cr_{min})$$

where $Cr_{avg}$ is the average chrominance Cr value the rectangular area, $Cr_{max}$ and $Cr_{min}$ are respectively the maximum and minimum chrominance CR values. Matrix generator block 11 generates a matrix by placing a 0 in every corresponding pixel location whose modified Cr value is below T and placing a 1 for every place above T. Each 1 represents a candidate redeye pixel.

The resultant matrix is then preferably applied to a candidate-erosion block 13 to refine the matrix. Candidate-erosion block 13 preferably includes a first operation 13a, in which it removes from consideration any candidate pixel without 3 or more candidates pixels as neighbors, followed by a second operation 13b, in which it remove any remaining candidate pixels that now have fewer than 2 candidates pixels as neighbors. This erosion of the candidate redeye areas favors solid redeye sections. These solid groups of candidate pixels are more likely to be the pupils than similarly sized broken up, or elongated, sections. Also, tiny isolated spots are removed and therefore do not interfere with later computations. These two passes 13a and 13b through the matrix are accomplished in linear time and can be implemented as a variation on cellular automata (considering only pixels in the mask for possible deletion rather than considering other pixels for possible genesis).

Next, a component-connecting block 15 implements a connected component algorithm that identifies each cohesive group of candidate redeye pixels for individual consideration. In essence, component-connecting block 15 discerns components made up of cohesive candidate pixels and stores them in a list. Preferably, statistical data about each cohesive group of candidate pixels is generated as each component is identified and is stored in the list of components. The statistical data recorded for each component include, for example, the value of the brightest pixel (preferably in terms of the above described color-based parameter), average brightness or average color-based parameter value, and the component size, which may be a cumulative pixel size. This is accomplished in linear time with respect to the number of pixels by considering each pixel once for each statistic sought due to the constant number of statistics being recorded and their simple nature.

First redeye identifier block 17 now targets the component that is most likely to be a redeye pupil. This is determined by picking the component containing the pixel with the highest modified Cr value (i.e. the highest color-based parameter value, which includes a measure of brightness). Applicant has found that this selection metric repeatedly yielded the best results in experiments and was quite uncannily good and linear with respect to the number of components (obviously less than n, where n is the total number of pixels in the entered image region of interest).

Having information about the first pupil in hand makes finding a second pupil easier. Therefore, second redeye identifier block 19 seeks a second pupil among the remaining components. First, a candidate component generator block 19a cycles through the statistical data gathered in block 15 and identifies all remaining components whose size parameter is within a preferred range of 0.5 to 1.5 times the size parameter of the component identified as the first redeye region in block 17, and whose average brightness parameter (or average color-based parameter) is within a preferred range of 0.5 to 1.5 times the corresponding parameter in the first redeye-component identified in block 17. The components that meet this criteria form a list of candidate components (drawn from elements of the original component list) whose size and brightness are within certain range constraints determined by the first redeye region. In this way, the second pupil selection is constrained by the characteristics of the first pupil region. It is to be understood that these range constraints may be adjusted for particular applications, and that a tighter range will reduce the number of resultant candidate components while a looser range will increase the number of resultant candidate components.

A determination is made at stage 19b as to whether a second pupil region exists based on the availability of candidate components. If no candidate components are identified in block 19a, i.e. none of the remaining components have characteristics similar to the first pupil region, then the operation of the second redeye identifier block 19 ends.

Otherwise, target component selector block 19c selects a second pupil region from the identified list of candidate components. This is done by calculating a boundary square population value for each candidate component, which is a measure of the pixel density within the smallest square in which a component fits. Alternatively, the boundary square population value of each component may be calculated, along with the other statistical data, in block 15 as each component of cohesive pixels is defined. Target component selector block 19c identifies the candidate component with the highest boundary square population value as the second pupil region. In this manner, this second pupil is determined to be the candidate component whose bounding square is most densely populated with redeye pixel candidates. These constraints require that the second pupil be close in size to the first pupil and nearly as bright. Picking the most densely packed candidate component favors circular components over oblong and scattered ones in order to pick the most pupil-like candidate. As stated above, if no suitable candidate is found, no second pupil is picked. The search for the second pupil takes linear time according to the number of candidate components found because the data used in calculation has already been computed in linear time and is conveniently stored in the candidate list.

Now that the pupils to be corrected have been found, one more step can refine the data so that the true extent of the pupils might be more closely approximated. It may happen that the redeye pupils contain some very red spots and some slightly red spots. The following processing sorts through pixels in the near vicinity to determine whether they should be corrected. Component boundary adjustment block 21 adjusts the areas of the identified one or two redeye pupils, i.e. target components, that are to be corrected by dilating their area out twice. This may be done by running two iterations of a cellular automaton that marks any pixel whose self or immediate neighbor is marked, but other methods of dilating known in the art are likewise suitable to the present invention.

Pupil redefinition block 23 then determines if the newly encompassed pixels within the dilated components meet a relaxed second threshold value $T_2$ based on the first threshold value. This may be done several ways. In one approach, original image data is fed through the relaxed second threshold $T_2$, which is preferably defined as $$T_2 = 0.9994 * T.$$

A second matrix of candidate pixels based on $T_2$ is thus constructed, but could alternatively have been constructed along with the first candidate matrix constructed by matrix generator 11 for time efficiency. In still another embodiment, the second matrix is constructed by examining only the pixels within the dilated components, and all pixels outside the dilated components are designated noncandidate pixels without examination.

Final redeye matrix generator block 25 then creates a final redeye replacement matrix by executing a bit-wise AND of the dilated original first matrix generated by block 11 and the new relaxed candidate matrix generated by block 23. This allows slightly less red neighbors to be included in the final replacement. If they had been included from the start in the formation of the first matrix, finding the pupils in the first place would have been more difficult because of the extra noise that would have resulted from the use of the lower threshold value.

Now that the actual pupils have been discovered, image modifier block 27 corrects the redeye pixels. Though the partially red pixels have been picked up by blocks 21–25, there may be a one-pixel layer of half-redeye pixels. These are pixels whose borders encompassed some redeye and some non-redeye in continuous space and who have been blurred by the discretizing operation of making the photograph digital. These pixels need to have their red removed but would look bad if they were darkened too much. This is where prior art redeye correction algorithms decide their darkness of pupil vs. lightness of glint compromise. Instead, the present invention replaces the image pixels corresponding to the final redeye replacement matrix generated in block 15 with a dark gray color while image pixels bordering it are replaced with a light gray color. In this way, the glint is a bright gray spot in the center of the eye, while the neighboring pixels of the pupil can be very dark. No pixel, however, has any of its original red color. Pixels between the pupil and iris form a feathered border to the corrected region so that no noticeable hard edges between the corrected and uncorrected sections are produced as artifacts. In this way, the replacement pixels are given gray values equal to 0.6 and 0.9 times their original brightness (measured as the sum of the R, G, and B values of the pixel in the original digital image), respectively.

The present invention may be implanted in hardware, software, or a combination of both.

Figure 2:
FIG. 2 is an example of a digital image having redeye regions selected for input to the present invention.

An example of the present redeye reduction technique applied to a digital image is shown in FIGS. 2–8. With reference to FIG. 2, a sample digital image 31 shows first 33 and second 35 redeye regions within a user defined input region of interest represented by a selection rectangle 37. In close proximity to redeye regions 33 and 35 are respective glint regions 39 and 38. Also within selection rectangle 37, is part of a drinking glass 41 and part of a cloth 43. Drinking glass 41 has a reddish tone and cloth 43 is bright red in color such that both glass 41 and cloth 43 constitute sources of confusion in attempting to identify redeye regions 39 and 38.

Figure 3:
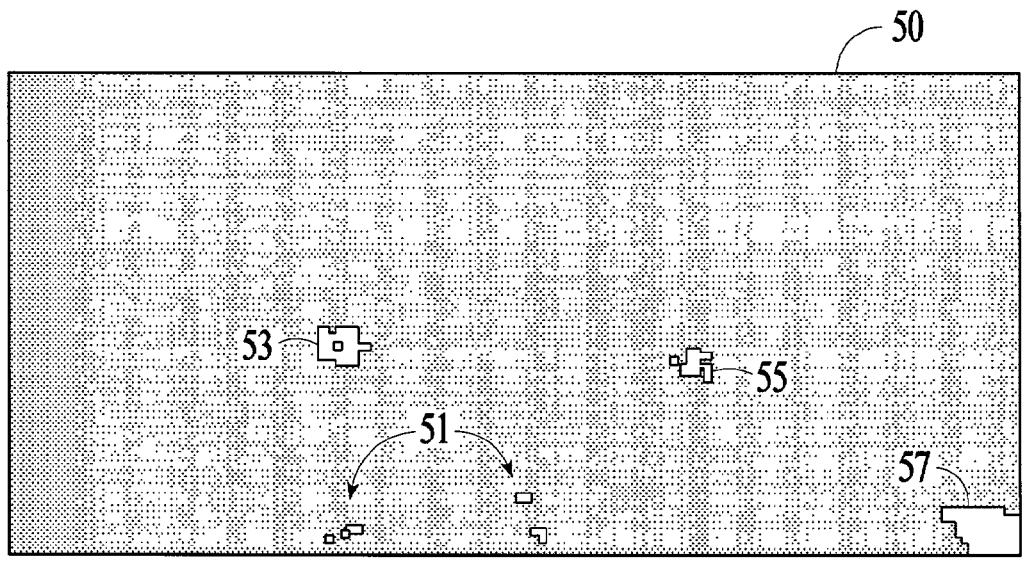
FIGS. 3–7 illustrate various stages of matrix manipulation in accord with the present invention.

The partial image defined by selection rectangle 37 is applied to matrix generator block 11 of FIG. 1, which as explained above, produces a matrix 50 of candidate and non-candidate pixels shown in FIG. 3. Candidate pixels are shown as white regions in FIG. 3, and non-candidate pixels are defined by darkening cross-hatch lines. Candidate pixels 53 correspond to redeye region 33. Candidate pixels 55 correspond to redeye region 35. Candidate pixels 51 correspond to reddish tones in glass 41, and candidate pixels 57 correspond to bright red cloth 43.

Figure 4:
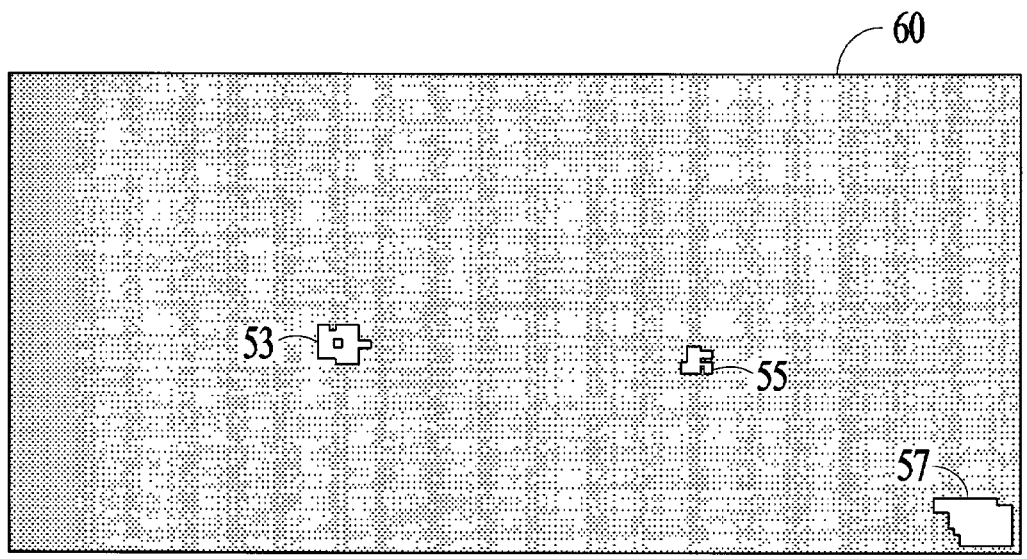

Matrix 50 is then applied to candidate-erosion block 13, which removes non-cluster regions of candidate pixels. The resultant, refined matrix 60 is shown in FIG. 4. All elements similar to those of FIG. 3 have similar reference characters and are defined above. As explained above, candidate-erosion block 13 first remove all candidate pixels having less than 3 neighboring candidate pixels, and then removes all remaining candidate pixels having less than 2 neighboring candidate pixels. This results in a trimming back of candidate pixel regions 53–57, as shown.

Component-connecting block 1 of FIG. 1, then formalizes the cohesive groups of candidate pixels making up regions 53–57 into respective components. As explained above, at this point, statistical data regarding each respective component is generated and stored for later use. In the present example, the results of such calculation would indicate that the pixel having brightest value would lie within one of regions 53 and 55. In the present example, it is assumed that region, or component, 53 includes the pixel with the highest bright parameter, and thus first redeye identifier block 17 of FIG. 1 would identify component 53 as the first redeye region.

At this point, second identifier block 19 surveys the statistical data of remaining components 55 and 57. Although the statistical data would show that both components 55 and 57 have similar average bright parameters, region 57 is disqualified do to it having a size outside a range defined by the size of component 53. Component 55, whoever, does have a size within a range defined by component 53 and thus it is identified as a candidate component for possibly being a redeye region. In the present example, there are no other candidate components and region 55 is thus identified as the second pupil. If additional candidate components had been identified, however, then their respective boundary square population value would be compared and the most densely populated candidate component would be targeted as being the second redeye region.

Figure 5:
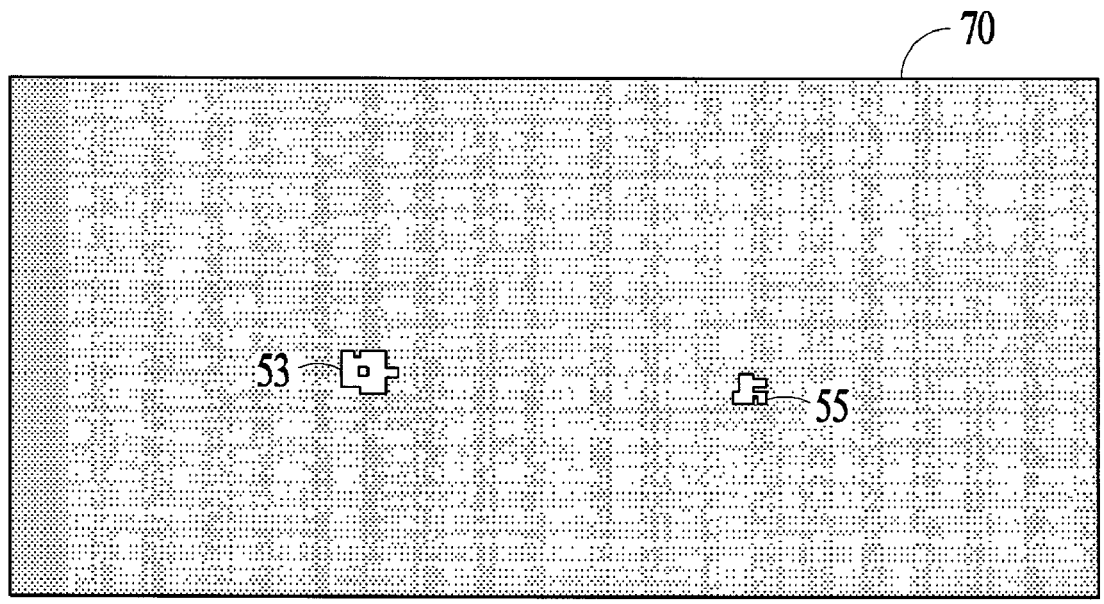

The resultant matrix 70 following second redeye identifier block 19 is shown in FIG. 5. As shown, all components except for the identified redeye regions 53 and 55 are removed.

Figure 6:
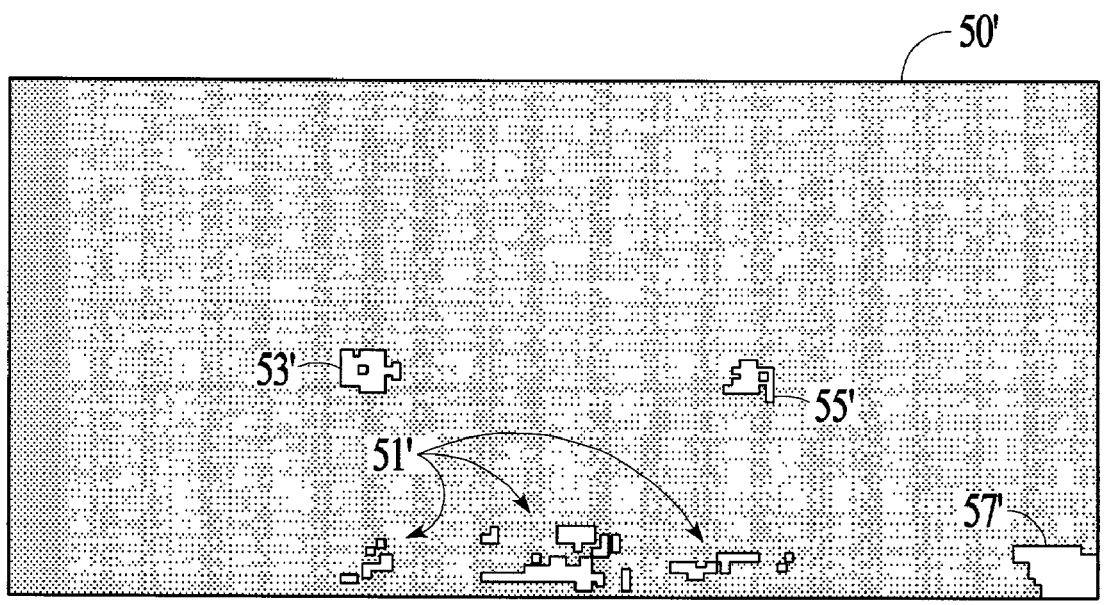

With reference to FIG. 6, a second matrix 50' generated either following block 19 or generated concurrently with matrix 50 by matrix generator block 11, compares the pixels of the selection rectangle 37 of FIG. 2 with a relaxed threshold based on the threshold used to generate matrix 50. Since the threshold used to generate matrix 50' of FIG. 6 is lower, it shows the inclusion of enlarged regions 53' and 55', and also many more candidate pixels 51' correspond to reddish tones in glass 41 and candidate pixels 57' correspond to bright red cloth 43.

As explained above, the area of candidate components 53 and 55 of matrix 70 in FIG. 5 are dilated outward and are bit-wise ANDed with corresponding candidate pixels 53' and 57' of matrix 50'. This operation is explained above as being conducted by final redeye matrix generator block of FIG. 1.

Figure 7:
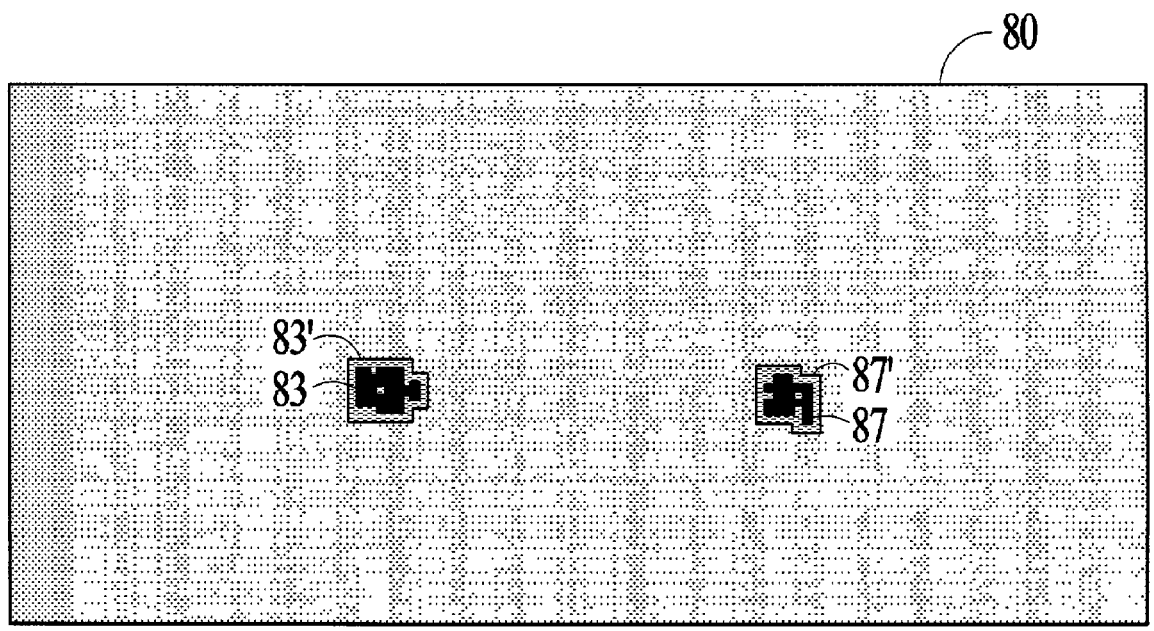

With reference to FIG. 7, the resultant matrix 80 following block is then use for redeye correction. Pupil regions 83 and 87 define the result of the above mentioned AND operation, and are shown dark to indicate that these regions of the original selection rectangle image are replaced with a uniform dark gray color. The pixels adjacent regions 83 and 87 constitute respective feathering region 83' and 87', and are shown light gray to indicate that these regions of the original selection rectangle image are replaced with a uniform gray color of higher brightness than that of respective regions 83 and 87.

Figure 8:
FIG. 8 shows the image of FIG. 2 with redeye regions corrected and glint regions preserved.

With reference to FIG. 8, the corrected image shows that pupil regions 33 and 35 have been replaced with a combination of dark and gray pixels while maintaining clearly visible glint regions 39 and 38.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A redeye reduction system for a digital image, said system comprising:
   a first matrix generating module for cycling through pixels of said digital image and comparing a color-based parameter of each of said pixels to a first threshold value, assigning a first logic level to pixels whose color-based parameter is not less than said first threshold value and a second logic level to pixels whose color-based parameter is less than said first threshold value, pixels assigned with said first logic level being defined as candidate pixels and pixels not assigned with said first logic level being defined as non-candidate pixels;
   a component-connecting module coupled to said first matrix generating module for identifying a plurality of cohesive groups of candidate pixels, and for identifying a first target cohesive group among said plurality of cohesive groups within which lies the candidate pixel having the color-based parameter of highest value among all of said plurality of cohesive groups, said first target cohesive group defining a first redeye region;
   an image modifying module coupled to said component-connecting module and having access to said digital image, said image modifying module being effective for identifying first image pixels within said digital image corresponding to said first target cohesive group, and for changing the color of said first image pixels to a common predetermined color;
   wherein said component-connecting module further generates statistical data for each of said plurality of cohesive groups including a high parameter value indicating the highest color-based parameter value of its corresponding candidate pixels, an average parameter value indicating the average color-based parameter value of its corresponding candidate pixels, and a size parameter value indicating its size; and
   a second-target-determining module coupled to said component-connecting module for identifying candidate cohesive groups among said plurality of cohesive groups characterized by having an average parameter value within a first range dependent on the average parameter value of said first target cohesive group and by having a size parameter value within a second range dependent on the size parameter value of said first target cohesive group,
   wherein said second-target-determining modules determines that no second redeye region exists if no candidate cohesive groups are identified.

2. The redeye reduction system of claim 1, wherein said first value range is defined as 0.5 to 1.5 of the average parameter value of said first target cohesive group.

3. The redeye reduction system of claim 1, wherein said second value range is defined as 0.5 to 1.5 of the size parameter value of said first target cohesive group.

4. The redeye reduction system of claim 1, wherein said second-target-determining module further calculates the boundary square population value of each candidate cohesive group and identifies as a second target cohesive group the candidate cohesive group having the largest boundary square population value, said second target cohesive group defining a second redeye region.

5. The redeye reduction system of claim 4, wherein said image modifying module is further effective for identifying second image pixels within said digital image corresponding to said second target cohesive group, and changing the color of said second image pixels to said common predetermined color.

6. A redeye reduction system for a digital image, said system comprising:
   a first matrix generating module for cycling through pixels of said digital image and comparing a color-based parameter of each of said pixels to a first threshold value, assigning a first logic level to pixels whose color-based parameter is not less than said first threshold value and a second logic level to pixels whose color-based parameter is less than said first threshold value, pixels assigned with said first logic level being defined as candidate pixels and pixels not assigned with said first logic level being defined as non-candidate pixels;
   a component-connecting module coupled to said first matrix generating module for identifying a plurality of cohesive groups of candidate pixels, and for identifying a first target cohesive group among said plurality of cohesive groups within which lies the candidate pixel having the color-based parameter of highest value among all of said plurality of cohesive groups, said first target cohesive group defining a first redeye region;
   an image modifying module coupled to said component-connecting module and having access to said digital image, said image modifying module being effective for identifying first image pixels within said digital image corresponding to said first target cohesive group, and for changing the color of said first image pixels to a common predetermined color;

a boundary-adjusting module coupled between said component-connecting module and said image modifying module, said boundary-adjusting module dilating out said first target cohesive group a predetermined number of times to encompass surrounding non-candidate pixels, and comparing the color-based parameter of said encompassed non-candidate pixels to a second threshold value less than said first threshold value, all encompassed non-candidate pixels having a color-based parameter not less than said second threshold value being reassigned said first logic level and converted to candidate pixels.

7. The redeye reduction system of claim 6, wherein said first target cohesive group is dilated twice.

8. The redeye reduction system of claim 6, wherein said second threshold value is 0.9994 times said first threshold value.

9. A redeye reduction system for a digital image, said system comprising:

a first matrix generating module for cycling through pixels of said digital image and comparing a color-based parameter of each of said pixels to a first threshold value, assigning a first logic level to pixels whose color-based parameter is not less than said first threshold value and a second logic level to pixels whose color-based parameter is less than said first threshold value, pixels assigned with said first logic level being defined as candidate pixels and pixels not assigned with said first logic level being defined as non-candidate pixels;

a component-connecting module coupled to said first matrix generating module for identifying a plurality of cohesive groups of candidate pixels, and for identifying a first target cohesive group among said plurality of cohesive groups within which lies the candidate pixel having the color-based parameter of highest value among all of said plurality of cohesive groups, said first target cohesive group defining a first redeye region;

an image modifying module coupled to said component-connecting module and having access to said digital image, said image modifying module being effective for identifying first image pixels within said digital image corresponding to said first target cohesive group, and for changing the color of said first image pixels to a common predetermined color;

a second matrix generating module for cycling through said pixels of said digital image and comparing said color-based parameter of each of said pixels to a second threshold value less than said first threshold value, assigning said first logic level to pixels whose color-based parameter is not less than said second threshold value, and assigning said second logic level to pixels whose color-based parameter is less than said second threshold value, wherein said first logic level is a logic high and said second logic level is a logic low; and a boundary-adjusting module coupled between said component-connecting module and said image modifying module, said boundary-adjusting module dilating out said first target cohesive group a predetermined number of times to encompass surrounding non-candidate pixels, converting all encompassed non-candidate pixels to candidate pixels by reassigning them with said first logic level, correlating the dilated first target cohesive group to corresponding pixels generated by said second matrix generating module, and redefining said first target cohesive group as the logical AND of each pixel within said dilated first target cohesive group with its corresponding pixel generated by said second matrix generating module.

10. The redeye reduction system of claim 9, wherein said first target cohesive group is dilated twice.

11. The redeye reduction system of claim 9, wherein said second threshold value is 0.9994 times said first threshold value.

12. A redeye reduction system for a digital image, said system comprising:

a first matrix generating module for cycling through pixels of said digital image and comparing a color-based parameter of each of said pixels to a first threshold value, assigning a first logic level to pixels whose color-based parameter is not less than said first threshold value and a second logic level to pixels whose color-based parameter is less than said first threshold value, pixels assigned with said first logic level being defined as candidate pixels and pixels not assigned with said first logic level being defined as a non-candidate pixels;

a component-connecting module coupled to said first matrix generating module for identifying a plurality of cohesive groups of candidate pixels, and for generating statistical data for each of said plurality of cohesive groups including a high parameter value indicating the highest color-based parameter value of its corresponding candidate pixels, an average parameter value indicating the average color-based parameter value of its corresponding candidate pixels, and a size parameter value indicating its size;

a first target-determining module coupled to said component-connecting module for identifying a first target cohesive group among said plurality of cohesive groups characterized as having the high parameter value of greatest magnitude, said first target cohesive group defining a first redeye region;

a second target-determining module coupled to said component-connecting module and effective for identifying candidate cohesive groups among said plurality of cohesive groups characterized by having an average parameter value within a first range dependent on the average parameter value of said first target cohesive group and by having a size parameter value within a second range dependent on the size parameter value of said first target cohesive group, and further effective for calculating the boundary square population value of each candidate cohesive group and identifying as a second target cohesive group the candidate cohesive group having the largest boundary square population value, said second target-determining module identifying no second redeye region if no candidate cohesive groups are identified and otherwise identifying said second target cohesive group as a second redeye region;

an image modifying module coupled to said first and second target-determining modules and having access to said digital image, said image modifying module being effective for identifying first image pixels within said digital image corresponding to said first target cohesive group and for changing the color of said first image pixels to a first common predetermined color, and further effective for identifying second image pixels within said digital image corresponding to said second target cohesive group in response to said second target-determining module identifying a second redeye region, and for changing the color of said second image pixels to a second common predetermined color.

13. The redeye reduction system of claim 12, wherein said first value range is defined as 0.5 to 1.5 of the average parameter value of said first target cohesive group.

14. The redeye reduction system of claim 12, wherein said second value range is defined as 0.5 to 1.5 of the size parameter value of said first target cohesive group.

15. The redeye reduction system of claim 12, further including a candidate-erosion module coupled between said first matrix generating module and said component-connecting module, said candidate-erosion module having a first stage of operation in which candidate pixels having less than three neighboring candidate pixels are converted to non-candidate pixels.

16. The redeye reduction system of claim 15, wherein said candidate-erosion module further has a second stage of operation following said first stage of operation in which candidate pixels having less than two neighboring candidate pixels are converted to non-candidate pixels.

17. The redeye reduction system of claim 16, wherein said candidate-erosion module converts a candidate pixel to a non-candidate pixel by reassigning it with said second logic level.

18. The redeye reduction system of claim 12, further including a boundary-adjusting module coupling said first and second target-determining modules to said image modifying module, said boundary-adjusting module dilating out said first and second target cohesive groups a predetermined number of times to encompass surrounding non-candidate pixels, and comparing the color-based parameter of said encompassed non-candidate pixels to a second threshold value less than said first threshold value, all encompassed non-candidate pixels having a color-based parameter not less than said second threshold value being reassigned said first logic level and converted to candidate pixels.

19. The redeye reduction system of claim 18, wherein said first target cohesive group is dilated twice.

20. The redeye reduction system of claim 18, wherein said second threshold value is 0.9994 times said first threshold value.

21. The redeye reduction system of claim 12, wherein said first matrix generating module further generates a secondary pixel mask by comparing said color-based parameter of each of said pixels to a second threshold value less than said first threshold value, assigning said first logic level to pixels whose color-based parameter is not less than said second threshold value, and assigning said second logic level to pixels whose color-based parameter is less than said second threshold value, wherein said first logic level is a logic high and said second logic level is a logic low; and
 a boundary-adjusting module coupling said first and second target-determining modules to said image modifying module, said boundary-adjusting module dilating out said first and second target cohesive groups a predetermined number of times to encompass surrounding non-candidate pixels, converting all encompassed non-candidate pixels to candidate pixels by reassigning them with said first logic level, correlating the dilated first and second target cohesive groups to corresponding pixels within said secondary pixel mask, and respectively redefining said first and second target cohesive groups as the logical AND of each pixel within said dilated first and second target cohesive groups with its corresponding pixel in said secondary pixel mask.

22. The redeye reduction system of claim 21, wherein said first and second target cohesive groups are dilated twice.

23. The redeye reduction system of claim 22, wherein said second threshold value is 0.9994 times said first threshold value.

24. The redeye reduction system of claim 12, wherein said first common predetermined color has a first brightness intensity, and wherein said image modifying module is further effective for changing the pixels of said digital image bordering said first and second image pixels to a second common predetermined color and having a second brightness intensity higher than said first brightness intensity.

25. The redeye reduction system of claim 12, wherein said first threshold value is defined as $Cr_{avg}+0.2*(CR_{max}-Cr_{min})$ after the Red, Green, and Blue components of all pixels have been raised to the ⅓ power.

26. A method of redeye reduction for a digital image including at least one redeye region, said method comprising:
 (a) a first matrix generating step for cycling through pixels of said digital image and comparing a color-based parameter of each of said pixels to a first threshold value, assigning a first logic level to pixels whose color-based parameter is not less than said first threshold value, and a second logic level to pixels whose color-based parameter is less than said first threshold value, wherein pixels assigned with said first logic level are defined as candidate pixels and pixels not assigned with said first logic level are defined as non-candidate pixels;
 (b) a component-connecting step for identifying a plurality of cohesive groups of candidate pixels, and for identifying a first target cohesive group among said plurality of cohesive groups within which lies the candidate pixel having the color-based parameter of highest value among all of said plurality of cohesive groups, wherein said first target cohesive group is defined as a first redeye region;
 (c) an image modifying step for identifying first image pixels within said digital image corresponding to said first target cohesive group, and for changing the color of said first image pixels to a common predetermined color;
 wherein said component-connecting step further includes the generation of statistical data for each of said plurality of cohesive groups including a high parameter value indicating the highest color-based parameter value of its corresponding candidate pixels, an average parameter value indicating the average color-based parameter value of its corresponding candidate pixels, and a size parameter value indicating its size; and
 a second-target-determining step following said component-connecting step for identifying candidate cohesive groups among said plurality of cohesive groups characterized by having an average parameter value within a first range dependent on the average parameter value of said first target cohesive group and by having a size parameter value within a second range dependent on the size parameter value of said first target cohesive group,
 wherein a determination is made that no second redeye region exists if no candidate cohesive groups are identified.

27. The redeye reduction method of claim 26, wherein said first value range is defined as 0.5 to 1.5 of the average parameter value of said first target cohesive group.

28. The redeye reduction method of claim 26, wherein said second value range is defined as 0.5 to 1.5 of the size parameter value of said first target cohesive group.

29. The redeye reduction method of claim 26, wherein said second-target-determining step further includes the calculating of the boundary square population value of each candidate cohesive group and identifying as a second target cohesive group the candidate cohesive group having the largest boundary square population value, said second target cohesive group being defined as a second redeye region.

30. The redeye reduction method of claim 29, wherein said image modifying step further includes identifying second image pixels within said digital image corresponding to said second target cohesive group, and changing the color of said second image pixels to said common predetermined color.

31. A method of redeye reduction for a digital image including at least one redeye region, said method comprising:
- (a) a first matrix generating step for cycling through pixels of said digital image and comparing a color-based parameter of each of said pixels to a first threshold value, assigning a first logic level to pixels whose color-based parameter is not less than said first threshold value, and a second logic level to pixels whose color-based parameter is less than said first threshold value, wherein pixels assigned with said first logic level are defined as candidate pixels and pixels not assigned with said first logic level are defined as non-candidate pixels;
- (b) a component-connecting step for identifying a plurality of cohesive groups of candidate pixels, and for identifying a first target cohesive group among said plurality of cohesive groups within which lies the candidate pixel having the color-based parameter of highest value among all of said plurality of cohesive groups, wherein said first target cohesive group is defined as a first redeye region;
- (c) an image modifying step for identifying first image pixels within said digital image corresponding to said first target cohesive group, and for changing the color of said first image pixels to a common predetermined color; and
- a boundary-adjusting step implemented in between steps (b) and (c), said boundary-adjusting step dilating out said first target cohesive group a predetermined number of times to encompass surrounding non-candidate pixels, and comparing the color-based parameter of said encompassed non-candidate pixels to a second threshold value less than said first threshold value, all encompassed non-candidate pixels having a color-based parameter not less than said second threshold value being reassigned said first logic level and thereby converted to candidate pixels.

32. The redeye reduction method of claim 31, wherein said boundary-adjusting steps dilates said first target cohesive group twice.

33. The redeye reduction method of claim 31, wherein said second threshold value is selected to be 0.9994 times said first threshold value.

34. A method of redeye reduction for a digital image including at least one redeye region, said method comprising:
- (a) a first matrix generating step for cycling through pixels of said digital image and comparing a color-based parameter of each of said pixels to a first threshold value, assigning a first logic level to pixels whose color-based parameter is not less than said first threshold value, and a second logic level to pixels whose color-based parameter is less than said first threshold value, wherein pixels assigned with said first logic level are defined as candidate pixels and pixels not assigned with said first logic level are defined as non-candidate pixels;
- (b) a component-connecting step for identifying a plurality of cohesive groups of candidate pixels, and for identifying a first target cohesive group among said plurality of cohesive groups within which lies the candidate pixel having the color-based parameter of highest value among all of said plurality of cohesive groups, wherein said first target cohesive group is defined as a first redeye region;
- (c) an image modifying step for identifying first image pixels within said digital image corresponding to said first target cohesive group, and for changing the color of said first image pixels to a common predetermined color; and
- a second matrix generating step for cycling through said pixels of said digital image and comparing said color-based parameter of each of said pixels to a second threshold value less than said first threshold value, assigning said first logic level to pixels whose color-based parameter is not less than said second threshold value, and assigning said second logic level to pixels whose color-based parameter is less than said second threshold value, wherein said first logic level is selected to be a logic high and said second logic level is selected to be a logic low; and
- a boundary-adjusting step implemented in between steps (b) and (c), said boundary-adjusting step dilating out said first target cohesive group a predetermined number of times to encompass surrounding non-candidate pixels, converting all encompassed non-candidate pixels to candidate pixels by reassigning them with said first logic level, correlating the dilated first target cohesive group to corresponding pixels generated in said second matrix generating step, and redefining said first target cohesive group as the logical AND of each pixel within said dilated first target cohesive group with its corresponding pixel generated in said second matrix generating step.

35. The redeye reduction method of claim 34, wherein said first target cohesive group is dilated twice.

36. The redeye reduction method of claim 34, wherein said second threshold value is selected to be 0.9994 times said first threshold value.

37. A redeye locating system for a digital image, said system comprising:
- a first redeye locating module effective for identifying a first group of pixels of said digital image as a first redeye region, and for generating statistical data for said first redeye region including at least one of an average parameter value indicating the average color-based parameter value of its corresponding pixels and a size parameter value indicating its size;
- a second redeye locating module effective for identifying a second group of pixels as a second redeye region based at least on one of the average parameter value of said first redeye region and the size parameter value of said first redeye region, wherein said second redeye region is characterized by having at least one of an average parameter value within a first range dependent on the average parameter value of said first redeye region and a size parameter value within a second range dependent on the size parameter value of said first redeye region.

38. A redeye locating system for a digital image, said system comprising:
 a first matrix generating module for cycling through pixels of said digital image and comparing a color-based parameter of each of said pixels to a first threshold value, assigning a first logic level to pixels whose color-based parameter is not less than said first threshold value and a second logic level to pixels whose color-based parameter is less than said first threshold value;
 wherein said first matrix generating module further generates a secondary pixel mask by comparing said color-based parameter of each of said pixels to a second threshold value less than said first threshold value, assigning said first logic level to pixels whose color-based parameter is not less than said second threshold value, and assigning said second logic level to pixels whose color-based parameter is less than said second threshold value, wherein said first logic level is a logic high and said second logic level is a logic low; and
 a component-connecting module coupled to said first matrix generating module for identifying a plurality of cohesive groups of candidate pixels, and for generating statistical data for each of said plurality of cohesive groups including a high parameter value indicating the highest color-based parameter value of its corresponding candidate pixels;
 a first target-determining module coupled to said component-connecting module for identifying a first target cohesive group among said plurality of cohesive groups characterized as having the high parameter value of greatest magnitude, said first target cohesive group defining a first redeye region;
 a boundary-adjusting module dilating out said first target cohesive group a predetermined number of times to encompass surrounding non-candidate pixels, converting all encompassed non-candidate pixels to candidate pixels by reassigning them with said first logic level, correlating the dilated first target cohesive group to corresponding pixels within said secondary pixel mask, and using said secondary pixel mask as a mask to redefine corresponding pixels within said first target cohesive group.

39. The redeye reduction system of claim 38, wherein said secondary pixel mask redefines said first target cohesive group as the logical AND of each pixel within said dilated first target cohesive group with its corresponding pixel in said secondary pixel mask.

* * * * *